INVENTORS.
GEORGE W. HARDMAN
MICHAEL WATTER.
BY John P. Tarbox
ATTORNEY

Patented May 18, 1943

2,319,455

UNITED STATES PATENT OFFICE 2,319,455

RESISTANCE WELDED METALLIC STRUCTURE

George W. Hardman, Brookline, and Michael Watter, Philadelphia, Pa., assignors to Edward G. Budd Manufacturing Co., Philadelphia, Pa., a corporation of Pennsylvania Application May 3, 1939, Serial No. 271,446

2 Claims. (Cl. 189—34)

The present invention relates to sheet metal surfacing, and more particularly to a skin sheet surface for aircraft wings or the like and to a method for securing the same.

In constructing aircraft parts, such as wings or the like, it has been the practice to spot weld relatively thin stainless steel skin sheets, at frequent intervals, to suitable stiffening members of the wing frame. In spot welding thin sheets, the metal is heated considerably at and adjacent the points where the welds are formed which expands the metal and causes it to be upset. Upon cooling, shrinking stresses are produced which buckle or wrinkle the thin sheets and give them an irregular or wavy surface. As a result, the surface of the sheets does not have a smooth appearance and causes air stream turbulence.

The present invention aims to overcome the above difficulties and objections by securing relatively thin skin sheets in such a manner that buckling or wrinkling thereof is prevented.

An object of the invention is to provide an improved structure for securing metallic skin sheets to supporting or stiffening members.

Another object is to utilize welding to secure the skin sheets to the stiffening members without welding of the sheets themselves whereby heating and the resulting buckling or wrinkling of the sheets is eliminated.

Another object is to eliminate undesirable stresses in the skin sheets, whereby thinner sheets can be utilized and a saving in cost is effected.

Another object is to secure skin sheets to stiffening members by utilizing securing strips adapted to be projection welded to the stiffening members.

A further object is to provide an improved method of securing skin sheets to supporting or stiffening members.

Other and further objects of the invention will be obvious upon an understanding of the illustrated embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein Fig. 1 is a fragmentary top plan view of a skin sheet secured to supporting members, illustrating an embodiment of the invention;

Figure 1:
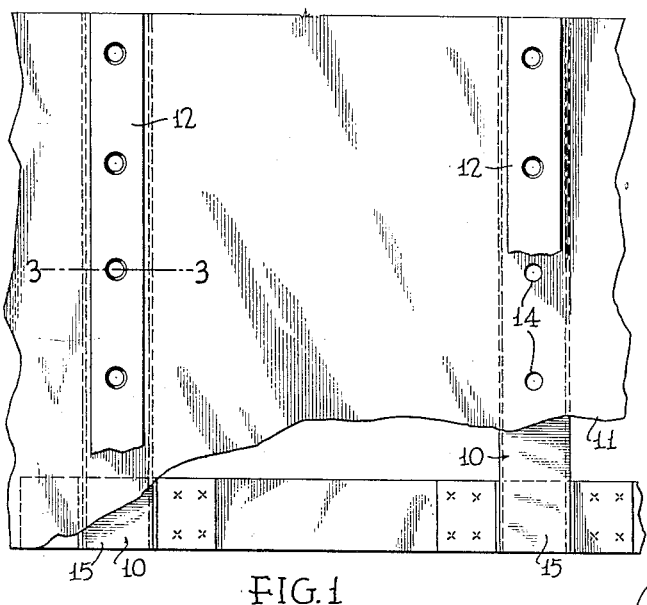
Figure 3:
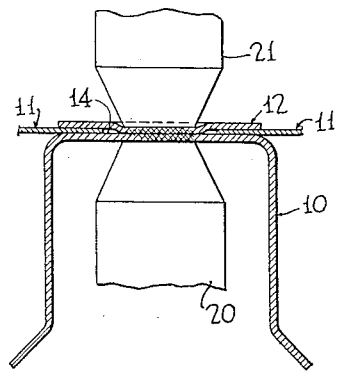
Fig. 3 is a sectional view taken along the line 3—3 on Fig. 1.
Figure 2:
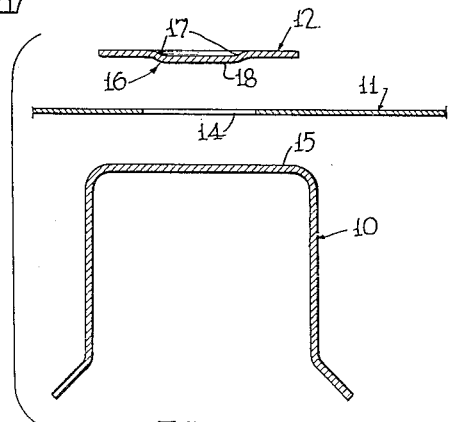
Fig. 2 is an exploded sectional view, illustrating the supporting member, the skin sheet, and a securing strip.

Referring to the drawing, and more particularly to Figs. 1, 2, and 3, there is shown a surface construction which, for example, may be utilized for aircraft wings or other aircraft parts. The construction comprises suitable parallel supporting members such as channel strips 10 acting as stiffening members; a skin sheet 11 formed of relatively thin metal preferably stainless steel having a thickness of about .006 of an inch; and suitable metal strips or bands 12 for securing the skin sheet to the supporting members.

As illustrated more particularly in Figs. 1 and 2, the skin sheet 11 is provided with a series of spaced, preferably circular, apertures 14 adapted to overlie or face the upper surface 15 of the stiffening members 10. The securing strips 12 have a series of lengthwise spaced dents intermediate the side edges thereof, providing downwardly depending projections or offset portions 16, which are alignable with the apertures 14 of the skin sheet and are adapted to extend therethrough. These projections 16 are pressed out of the plane of the strips 12 a distance substantially equal to the thickness of the sheets utilized. In their preferred form, the projections have annular downwardly and inwardly curved side walls 17 fitting into the apertures and have a substantially flat bottom or face portion 18 adapted to contact the upper surface 15 of the stiffening member 10 and be spot welded thereto.

The cases where the skin sheet will exert shearing forces on the projections, it is desirable to have the projections conform to the apertures as closely as possible and thereby prevent lateral or longitudinal movement of the sheet with respect to the supporting member 10. In the event the members 10 merely serve as stiffening means for the sheet and there is no shearing relation between the members and sheet, the apertures may be somewhat oversized or slightly elongated longitudinally to facilitate insertion of the projections therein, even if certain projections and apertures are slightly out of alignment. The projections, by being offset from the strip a distance equal to the thickness of the skin sheet, enable adjacent portions of the strip to securely hold the skin sheet against outward movement from the stiffening members. Also, by forming the projections intermediate and spaced from the side edges of the strip, the strips are not weakened and can withstand the strains to which they may be subjected.

Preferably, the securing strips 12 are somewhat thicker than the skin sheet to prevent upsetting thereof due to the heat of the welding operations and are relatively narrow so that they do not show buckling or wrinkling stresses after cooling. In this manner the strips, when secured, are flatwise disposed against the surface of the skin sheet and have a smooth appearance. Also, by securing the skin sheet without welding it directly to the supporting members, wrinkling or buckling is prevented and even the thinnest available skin sheet remains entirely smooth. The securing strips, when utilized for securing skin sheets to aircraft parts, preferably extend in the direction of the flow of air along the surface and when so extended, do not offer any material air resistance.

Figure 4:
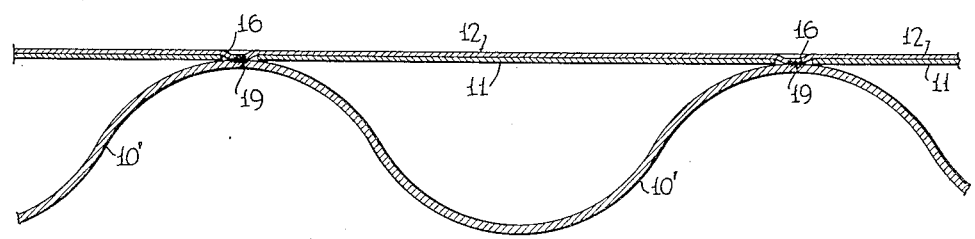
Fig. 4 is a sectional view, illustrating a skin sheet secured to a corrugated supporting member.

In Fig. 4 a modified construction is shown, wherein the stiffening member 10' is in the form of corrugated sheet such as used for curved or irregular parts of aircraft. The skin sheet is provided with apertures 14 facing the crest 19 of each corrugation and dents providing projections 16 are formed in the strip which extend downwardly through the apertures 14 and are welded to the crest surface of the corrugations.

Figure 5:
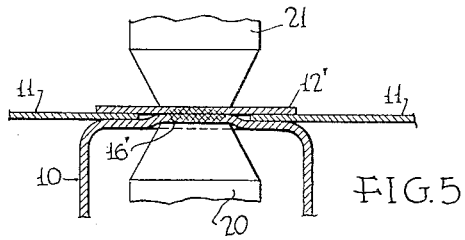
Fig. 5 is a sectional view of another embodiment of the invention.

A modified embodiment is illustrated in Fig. 5 wherein projections 16' are extended upwardly from the stiffening members 10, fit through the apertures 14 of the skin sheet, and are welded to the under side of a substantially smooth securing strip 12'. An advantage of this construction is that the upper surface of the securing strip is entirely smooth throughout its length and does not offer any air resistance. Another advantage is that the projections 16' and the flanges of the stiffening members can be formed simultaneously. Furthermore, the strip 12' can be very narrow and of only sufficient width to cover the apertures. In this manner a material saving is effected.

A preferred method of assembling the constructions illustrated in Figs. 1 to 5 comprises placing the skin sheet on the stiffening member and placing the securing strip above the skin sheet with the projections 16 or 16' extending through the apertures 14 of the skin sheet. Thereafter, as illustrated in Fig. 3, an electrode 20 of an electric welding tool is moved into engagement of the underside of the stiffening member and a second electrode 21 of the welding tool is moved into engagement with the upper side of the securing strip. Preferably, the electrodes have contact surfaces conforming substantially to the upper side of the securing strip and the under side of the stiffening member to hold the parts of a construction securely together. Welding current is then supplied to the electrodes and the securing strip and stiffening member are welded together. If desired, the projections may be utilized as an electrode of a welding tool to join the parts by what is known as projection welding. By eliminating the necessity of applying two electrodes and effecting the weld with a single electrode instead, the speed with which the welds may be successively formed is greatly increased.

Figure 6:
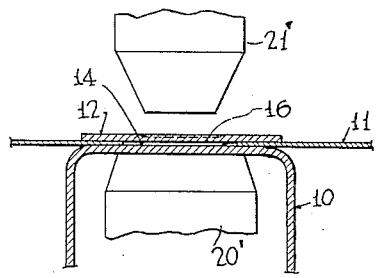
Fig. 6 is a sectional view illustrating a method of securing a skin sheet to a supporting member.

In Fig. 6 another method of securing a skin sheet is illustrated. This method comprises preforming apertures in a skin sheet, placing the sheet on supporting members, aligning the apertures to overlie the members, and placing a securing strip or band upon the skin sheet above and in alignment with the apertures. The underside of the stiffening member is then engaged or supported by one electrode or contact 20' of the welding tool and the other electrode or contact 21' of the welding tool is brought into engagement with the upper surface of the securing strip at a point directly above an aperture of the skin sheet. Thereafter the electrode 21 is moved with sufficient force to apply pressure upon the strip to displace a portion of the strip and form a projection 16, shown in dotted lines. This projection 16 is forced through the aperture of the skin sheet and, when the bottom 18 thereof is brought into engagement with the surface of the stiffening member, welding current is supplied to the electrodes to effect a weld between the bottom of the projection and stiffening member. By employing this method, it is not necessary to preform the projections or offsets 16 in the strips or the stiffening members. They can be conveniently formed after applying the strips to the sheets and extended into apertures at irregularly spaced intervals.

From the foregoing description it will be seen that the present invention provides an improved skin sheet structure which is simple and economical in construction. The securing strips prevent buckling or wrinkling of the sheets and provide a smooth surface which does not resist air flow. The strips further strengthen and reinforce the sheets and greatly minimize strains to which the sheets formerly were subjected, thus permitting safe use of relatively thinner sheets. By welding the strips to the supporting members, the danger of burning or otherwise impairing the sheets is eliminated and thin sheets which normally cannot be welded can be employed when desired. The resulting structure is rugged and can readily withstand any severe strains to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

What we claim is:

1. In a resistance welded metallic structure having a metal skin sheet of such thinness that it is susceptible to wrinkling and distortion normal to the plane thereof when subjected to localized stresses in such plane, and a supporting member for said sheet engaging one side thereof, said sheet having spaced openings contiguous the engaging surface of said member, a metallic strip engaging the opposite side of said sheet and overlying said openings, one of said supporting member and strip having depressions therein spaced the same as said openings to provide projections extending normal to the surface thereof and of a depth not greater than the thickness of said sheet, said projections extending through said openings and engaging the other of said supporting member and strip, and a resistance spot weld integrally uniting said supporting member and strip through the metal of each of said depressions, whereby said sheet is held in secured relation between said supporting member and strip and free from localized tensioning stresses arising as a result of the spot welding operation.

2. In a resistance welded metallic structure having a metal skin sheet of such thinness that it is susceptible to wrinkling and distortion normal to the plane thereof when subjected to localized stresses in such plane, and a supporting and stiffening structure for said sheet having spaced metallic elements engaged with one side of said sheet, the improvement in securing said sheet to said elements in such manner that the sheet in secured position is free from localized tensioning stresses incident to the securing operation, which comprises a plurality of metallic strips of greater thickness than said sheet, each strip being in engagement with said sheet at the side thereof directly opposite a supporting structure element, said sheet having a plurality of apertures therethrough between each strip and supporting structure element, each of said strips having depressions therein to provide lateral projections extending through the adjacent openings with the faces thereof engaging the adjacent supporting structure element, and, resistance spot welds integrally uniting said strips and elements through the metal of the bottoms of said depression, said projections being of a depth not greater than the thickness of said sheet, whereby said sheet is firmly clasped between said strips and supporting structure.

GEORGE W. HARDMAN.
MICHAEL WATTER.